United States Patent [19]
Tripp et al.

[11] Patent Number: 5,618,572
[45] Date of Patent: *Apr. 8, 1997

[54] FLAVORED MALT BEVERAGES PREPARED BY USING ULTRAFILTRATION METHODS

[75] Inventors: Matthew L. Tripp, Nashotah; Sydney R. Rader, Fredonia; Subba C. Rao, Brookfield, all of Wis.; David S. Ryder, Libertyville, Ill.

[73] Assignee: Miller Brewing Company, Milwaukee, Wis.

[*] Notice: The term of this patent shall not extend beyond the expiration date of Pat. No. 5,439,699.

[21] Appl. No.: 326,625

[22] Filed: Oct. 20, 1994

Related U.S. Application Data

[63] Continuation-in-part of Ser. No. 29,740, Mar. 11, 1993, Pat. No. 5,439,699.
[51] Int. Cl.$^6$ ............... C12C 12/04; C12G 3/08; C12H 3/00
[52] U.S. Cl. ............ 426/592; 426/330.4; 426/493
[58] Field of Search .................. 426/330.4, 11, 426/14, 16, 329, 592, 493

[56] References Cited

U.S. PATENT DOCUMENTS

| | | |
|---|---|---|
| 2,803,546 | 8/1957 | Bergmann et al. |
| 3,332,779 | 7/1967 | Krabbe et al. |
| 3,798,331 | 3/1974 | Bavisotto et al. ............ 426/16 |
| 3,843,809 | 10/1974 | Luck ............................ 426/592 |
| 3,908,021 | 9/1975 | Rehberger et al. .......... 426/16 |
| 4,021,580 | 5/1977 | Raymond et al. ............ 426/16 |
| 4,440,795 | 4/1984 | Goldstein et al. ........... 426/592 |
| 4,612,196 | 9/1986 | Goldstein et al. ........... 426/14 |
| 4,775,541 | 10/1988 | Brown et al. ................ 426/271 |
| 5,114,492 | 5/1992 | Wolf et al. ................... 127/42 |
| 5,294,450 | 3/1994 | Word et al. .................. 426/11 |
| 5,439,699 | 8/1995 | Tripp et al. .................. 426/592 |

*Primary Examiner*—Esther Kepplinger
*Assistant Examiner*—Curtis E. Sherrer
*Attorney, Agent, or Firm*—Quarles & Brady

[57] ABSTRACT

A method is disclosed of preparing a colorless, clear beer by a method including ultrafiltration and the addition of dextrins, bittering agents and a foam enhancer. Methods of preparing improved nonalcoholic malt beverages and making natural beer foaming components also are disclosed. Further methods are disclosed for making flavored malt beverages, including a stable citrus flavored malt beverage.

19 Claims, 1 Drawing Sheet

FLAVORED MALT BEVERAGES PREPARED BY USING ULTRAFILTRATION METHODS

The application is a continuation-in-part of application Ser. No. 08/029,740 filed Mar. 11, 1993 now U.S. Pat. No. 5,439,699.

FIELD OF THE INVENTION

The present invention generally relates to brewing. More particularly, it relates to flavored malt beverages and methods of preparing them.

BACKGROUND OF THE INVENTION

Conventional beers are usually straw-colored or darker colored liquids. Although colorless, clear, malt-based beverages have been made in the past by the brewing industry, those products contained tartaric acid and had other attributes which rendered them less than optimally suitable for use as a flavored malt beverage base.

The Goldstein, et al. U.S. Pat. No. 4,440,795 discloses a process for the production of a stable, malt beverage which comprises subjecting a beer to reverse osmosis using a membrane having a molecular weight cutoff (MWCO) of about 200 to obtain a permeate, which consists of water, alcohol, and organics having a molecular weight of less than about 200. The permeate obtained does not possess an acceptable beer flavor but it is useful as a base to which citrus flavoring can be added to obtain a flavored malt beverage. However, this malt base is too difficult to obtain due to extremely low permeation rates. The disclosure of the above patent, and of all other patents recited herein, are incorporated by reference as if fully set forth herein.

A second Goldstein, et al. U.S. Pat. No. 4,612,196 discloses a method of preparing a straw-colored beer of low alcoholic content using a reverse osmosis membrane wherein a retentate is used having a molecular weight cutoff (MWCO) of less than about 100 for organics. This permeate is also unacceptable as a beverage base due to the extremely slow permeation rate and flat flavor profile.

There is a continued interest in new and different alcohol based beverages. This has encouraged the research and development of flavored malt beverage products. For example, the production of flavored malt beverages and other malt beverage products is disclosed in U.S. Pat. Nos. 2,803,546; 3,332,779; 3,798,331; 3,908,021; 4,021,580; and 5,294,450.

U.S. Pat. Nos. 2,803,546; 3,332,779; and 4,021,580 disclose beverages which are made from bases which are not beers and, therefore, have unacceptable flavor profiles as flavored beverages. U.S. Pat. No. 3,798,331 produces a base which is not neutral enough to produce an acceptable flavored beverage. U.S. Pat. No. 3,908,021 discloses a base made from green malt which results in too much beer character for an acceptable flavor profile in flavored malt beverages. U.S. Pat. No. 5,294,450 discloses a flavored malt beverage having a flavor profile typical of tartaric acid (a lingering, dry, sour effect).

However, a need remains for flavored malt beverages which achieve high levels of consumer "overall liking" and "drinkability" while avoiding user sensations of fullness after consuming moderate amounts of the flavored beverage. In general, the consumer acceptability of flavored malt beverages is influenced by individual ingredients and the interaction between the ingredients. For example, the creation of a flavored malt beverage with desired taste characteristics depends on a number of ingredients and factors. These ingredients and factors include but are not limited to acids, flavoring agents, carbonation level, alcohol level, sugar level, the relative proportion of alcohol and sugar levels, and the raw materials which are used (malt and fermentable carbohydrates).

A need also exists for a stable citrus flavored malt beverage. Flavored malt beverages typically have a substantial amount of sulfur containing amino acids and other labile components which in the presence of citrus flavoring cause off aromas. These off aromas have been described by taste panels as resembling "rotten fruit" and "wet dog." The off aromas are generally more obvious when the flavored malt beverage has been stored at elevated temperatures.

SUMMARY OF THE PRESENT INVENTION

Another object of the invention is to disclose a method of making a flavored malt beverage wherein the ingredients cooperate to enhance drinkability and to minimize consumer sensations of fullness.

It is still further an object to disclose a method of making a "stable" citrus flavored malt beverage.

Another object of the invention is to disclose flavored malt beverages made by the above methods.

A still further object of the invention is providing flavored or unflavored malt beverages which can be used as mixers.

The method of the present invention for preparing a flavored malt beverage comprises removing at least a portion of the color from a base beer to form a reduced color malt base; and combining the reduced color malt base with at least one flavoring, a sweetening agent, malic acid, and carbon dioxide to thereby produce the flavored malt beverage, wherein the flavored malt beverage contains 2.5 to 2.8% v/v $CO_2$, 2.9 to 3.85% w/w alcohol, 12.5 to 22 calories/fluid oz., 0.05 to 0.5 g/100 ml malic acid, 5.4 to 11.6% w/w real extract, and less than 500 ppm or no tartaric acid. The removing step may be accomplished by subjecting the base beer to ultrafiltration at a pressure of 30 psi to 190 psi using a membrane having a nominal 300 weight cutoff range or by treatment of the base beer with carbon. The sweetening agent may be a carbohydrate derived from corn. The preferred flavorings are at least one of quinine, brandy, loganberry, lemon, apple, or tea flavors.

Another method of the present invention for preparing a citrus flavored malt beverage comprises removing at least a portion of the color from a base beer to form a reduced color malt base; and combining the reduced color malt base with International Flavors and Fragrances lemon flavoring formula no. 13580157, a sweetening agent, malic acid, and carbon dioxide to thereby produce the citrus flavored malt beverage having the essential absence of sulfide off-flavors if stored at least four months at 75° F., wherein the citrus flavored malt beverage contains 2.5 to 2.8% v/v $CO_2$, 3.45 to 3.85% w/w alcohol, 20 to 22 calories/fluid oz., 0.4 to 0.5 g/100 ml malic acid, 10 to 11.6% w/w real extract, and less than 500 ppm or no tartaric acid. The removing step can be accomplished by treating the base beer with carbon but a preferred method is by subjecting the base beer to ultrafiltration at a pressure of 30 psi to 190 psi using a membrane having a nominal 300 weight cutoff range. The sweetening agent may be any carbohydrate derivative.

In accordance with the foregoing methods, the resulting malt beverage product will comprise the indicated parameters and ingredients.

Another aspect of the invention provides a flavored malt beverage kit comprising a reduced color malt base in a first container, the reduced color malt base having been produced by removing at least a portion of the color from a base beer and a flavoring in a second container, whereby the flavored malt beverage is formed by mixing the reduced color malt base with the flavoring and wherein the flavored malt base has less than 500 ppm tartaric acid or no tartaric acid.

It will be apparent to those skilled in the art from the description which follows that the stated objects and other advantages can be achieved by practice of the present invention.

DESCRIPTION OF THE PREFERRED EMBODIMENTS

Figure 1:
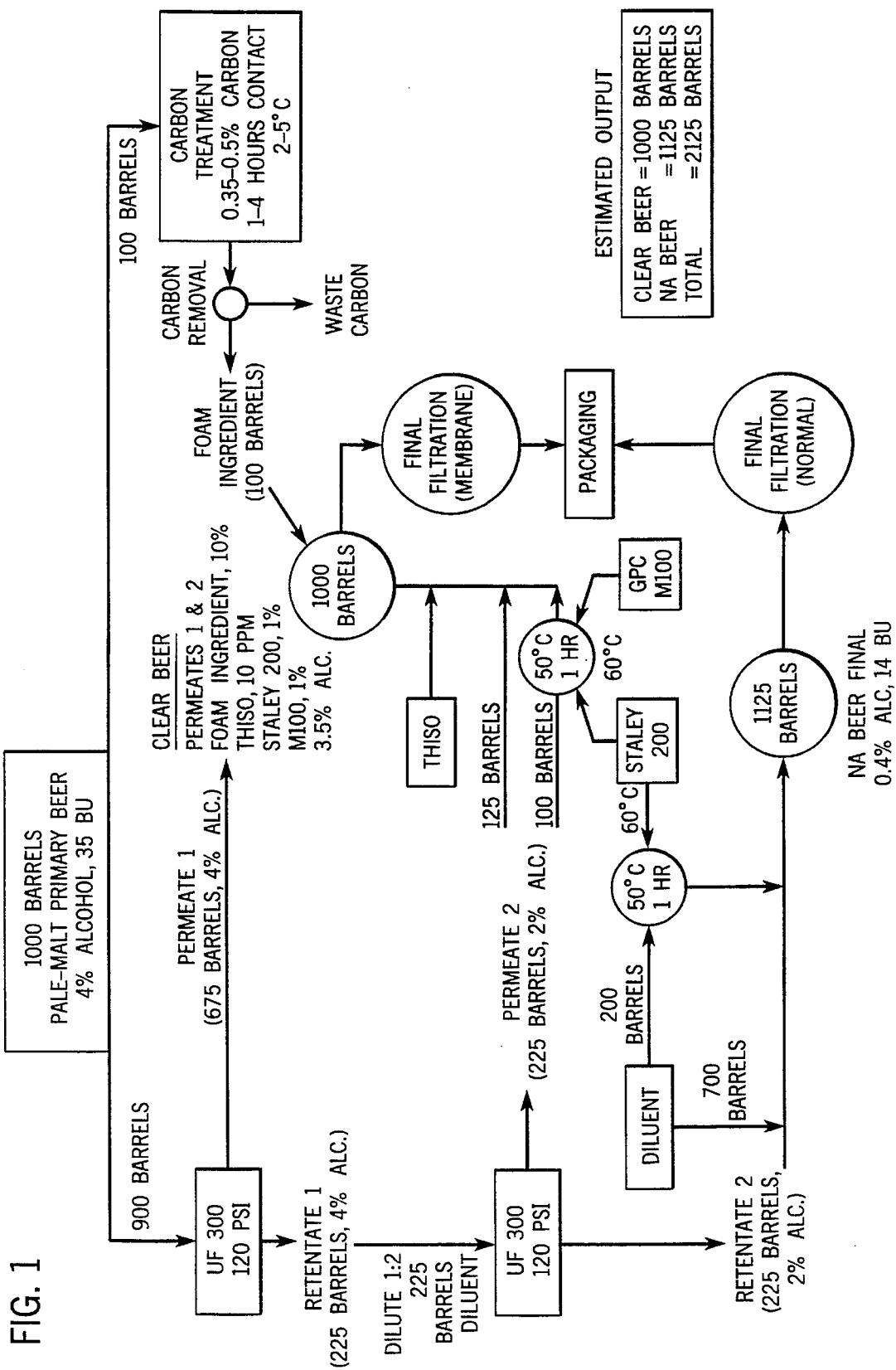
FIG. 1 depicts a flow chart of the present invention using as a basis 1000 barrels of feed beer.

Referring to FIG. 1, in the preferred method of the present invention both a clear beer and a nonalcoholic malt beverage (NA) are co-produced. By using the preferred method, for example, 1000 barrels of a feed beer (4% alcohol) can be converted into 2125 barrels of final product (1000 barrels of the clear beer and 1125 barrels of nonalcoholic beer).

For purposes of illustration, the preferred method is described starting with 1000 barrels feed beer (4% alcohol, 35 BU). 100 barrels of the feed beer are carbon treated and filtered to remove the carbon and obtain a filtrate for use as a natural beer foaming component. The remaining 900 barrels of the feed beer are concentrated 4 fold via ultrafiltration with the preferred membrane to obtain 675 barrels of a 1st permeate (4% alcohol) for preparing the colorless, water-white, clear beer and 225 barrels of a retentate (4% alcohol). In other words, the beer components retained by the ultrafiltration membrane have a 4-fold greater concentration in the retentate than they do in the feed beer by virtue of the respective volumes of feed beer to retentate (900 barrels:225 barrels or 4:1). The retentate is diluted to two times with diluent water, and the 450 barrels of diluted retentate is subjected to ultrafiltration using the same type of membrane. The 225 barrels of the 2nd permeate (2% alcohol) are used as described herein to make the clear beer and the 225 barrels of the retentate (2% alcohol) is used for preparing the NA beer.

To formulate the colorless, water-white, clear beer the following are blended:

- 675 barrels of permeate 1 (4% alcohol)
- 225 barrels of permeate 2 (2% alcohol)
- 100 barrels of the carbon treated feed beer (4% alcohol)
- 1% final concentration of intermediate dextrin (Staley 200)
- 1% final concentration of high dextrin (GPC M100)
- 10 ppm final concentration of the light stable hop extract, tetrahydroisohumulone (THISO)

One product obtained is 1000 barrels of a colorless, water-white, clear beer (3.5 w/w alcohol, 10 BU). To formulate the nonalcoholic (NA) malt beverage the following are blended:

- 225 barrels retentate (2% alcohol, 40 BU)
- 900 barrels diluent water
- 4% intermediate dextrin (Staley 200)

The second product obtained is 1125 barrels of a nonalcoholic (NA) beer (0.4% w/w alcohol; 14 BU).

The grand total of the colorless, water-white, clear beer and the nonalcoholic (NA) beer is 2125 barrels.

The feed beer may be a commercial beer or a specially brewed pale beer. Several different commercial beers have been used as the starting material. For example, an 80–100% pale malt beer having a color of about 4° to about 5° SRM may be used. However, a 100% pale malt beer having a color of about 4° to about 5° or less than 5° SRM is preferred.

The properties of the ultrafiltration membrane to be used in the process of the present invention are important. The membrane must permit ethanol to pass therethrough. If the membrane pore size is too large (e.g., MWCO 500), the permeate, which is used to make the clear beer will be too colored and not acceptable. Also, if the membrane is too tight, the permeation rate will be intolerably slow and important flavor components in the feed beer will be retained, resulting in an unpleasant, unbalanced, and unacceptable permeate. The permeation rate is a function of the characteristics of the starting beer and filter membrane. A membrane with a nominal 300 molecular weight cut-off range and with the same properties as the OSMONICS MX07 UF300 polyamide/polysulfone composite membrane is preferred.

It also has been found that the flavor of the permeate and the colorless, clear beer and the retentate and the resulting nonalcoholic malt beverage are influenced by the flavor of the feed beer. The greater the flavor of the feed beer, the more flavorful the permeate and retentate. For example, permeates made from highly hopped feed beers (e.g., 35 BU Cascade hops) have proportionately more hop flavor. Similarly, permeates with greater malt flavor are obtained when 100% malt was used in place of an adjunct such as syrups. The preferred feed beers are 100% pale malt brews which give water-white permeates. It is apparent that important beer flavor molecules permeate the membrane, and their concentration can be increased, decreased, and changed by changing the brewing ingredients and levels of ingredients and regime.

An excellent, natural beer foam for the colorless, water-white, clear beer can be made using natural beer foaming components made by a variety of processes, including cold contact of water with ground malt followed by carbon treatment to reduce color (5% use level), carbon treatment of the preferred ultrafiltration retentate (4% use level), carbon treatment of Brewer's yeast extract (2–10% use level), or carbon treatment of the feed beer (6–12% use level).

The natural beer foaming components made by the cold contact with malt process, while imparting excellent foam to the beer, requires special equipment and may impart a biscuit off-flavor to the final product, therefore it is less preferred. The natural beer foaming components made by carbon treating the retentate also produces excellent foam and adds desirable malty flavor, however the removal of carbon from the viscous retentate can be difficult and requires special equipment. The preparation of the Brewer's yeast extract requires special equipment. Therefore they are less preferred.

The preferred natural beer foaming components are made by the carbon treating of a portion of the feed beer and removing the carbon with filtration to obtain a product which when added to the permeate at 6–12% w/w imparts excellent foam and a malty flavor. Furthermore, removal of the carbon from the feed beer can be accomplished using filtration employed in normal brewery operations or any one of a variety of filtration devices and is a relatively easy task.

The carbon for use in the method of making the natural beer foaming components of the present invention is preferably a food grade activated carbon. An acceptable carbon is DARCO KBB made by American Norit Company, Inc., 1050 Crown Pointe Parkway, Suite 1500, Atlanta, Ga. 30338. The quantity to be used is preferably about 0.25 to about 1.0% by weight or about 0.67 lbs. to about 2.68 lbs. per barrel of feed beer which is calculated as follows: 0.25% is 2.5 g/L×3.785 L/gallon×31.5 gallons/barrel×0.0022 lb/g= 0.672 lbs/barrel. The carbon is kept in the feed beer for a period long enough to absorb color bodies and to reduce the color to the desired level (e.g. at least about 2 minutes). The carbon is then removed using any one of a variety of filtration devices, such as a Millipore membrane filter (38 L scale), which is available from the Millipore Filter Corporation of Bedford, Mass.

The use of diatomatous earth (DE) as a filter aid is to be avoided because it tends to remove proteins beneficial to foam formation. Similar foam losses resulted when cellulosic pads containing DE were used. It also has been found in making the clear beer, that the use of diatomatous earth (DE) as a filter aid in the removal of carbon or as a final polishing filter prior to packaging results in a dramatic reduction in foam, presumably due to protein removal. Therefore, it is not recommended.

Although a cellulose filter aid is preferred at plant scale to remove carbon, the Millipore type membrane filters (38 L scale) are preferred at lab scale because they can be used both to remove the carbon from the foaming component and as a final filter for the beer without having any effect on foam amount and quality.

We also have discovered that a more desirable beer-like body and dryness can be produced in either the clear beer or a nonalcoholic malt beverage by increasing the concentration of dextrins. A combination of intermediate dextrins (e.g. Staley 200 or 225) to provide body and high molecular weight dextrins (e.g. GPC's M100 Maltrin) to provide body and dryness are used to make the preferred colorless, clear beer at levels of about 1% by weight each. The preferred dextrins content for the nonalcoholic malt beverage is obtained by adding about 1–5% by weight of the intermediate dextrins (Staley 200 or 225).

The bitterness of the colorless, water-white, clear beer and the nonalcoholic beer can be important. During the ultrafiltration step of the preferred method of the present invention using highly hopped feed beers (20–45 BU), a 30–50% loss of bittering units (BUs) occurs, resulting in a less bitter retentate than expected. Levels of BUs in the permeate are typically below the level of meaningful detection (<2 BU). Carbon treatment of the feed beer also removes BUs to a point below detection resulting in a light stable fraction.

In making the clear beer a hopping material is added to obtain the desired BU level prior to the final filtration. The preferred hopping material is tetrahydroisohumulone (THISO) disclosed in U.S. Pat. No. 4,644,084. When it is used as the source of bittering, the light stability of the colorless, clear beer is not an issue.

A variety of nonalcoholic (NA) beers can be made using the retentate from the ultrafiltration of the preferred method. The retentate which would normally be a waste stream produces nonalcoholic malt beverage which are beer-like with little or no wortiness.

In the preferred method of improving the body and dryness of a nonalcoholic malt beverage the dextrose and intermediate dextrin contents are increased. The result is an NA beer which has the desired sweetness, body and dryness and which is balanced without any excess bitterness. One method of accomplishing this is to use glucoamylase (GA) at about the same level (e.g. 882 units GA/liter; 1 unit is 1 micromole of dextrose liberated per minute at pH 4.3 using a 10 DE starch) that the GA is used in making a light beer, followed by a residence time of about 4–8 days depending on the degree of attenuation desired (4 days, 0.5% dextrose; 8 days, 1% dextrose), and followed by flash pasteurization. The resulting nonalcoholic malt beverage has a rich, creamy, well balanced character. Most preferably, glucoamylase is added directly to the diluted retentate.

A second method of improving the body and dryness of a nonalcoholic beer is to increase the dextrose and intermediate dextrin content of the nonalcoholic malt beverage by simply adding low and intermediate sized dextrins to add body, sweetness, and balance. It has been found that the addition of 1–5% intermediate dextrins (Staley 200 or 225) results in a full bodied, nicely balanced nonalcoholic malt beverage. The increase in dextrose and intermediate dextrin content by either the use of GA or the addition of intermediate dextrins provides a method for making a wide range of nonalcoholic malt beverages of improved properties.

The practice of the invention is further illustrated by the examples.

EXAMPLE 1

Preparation of Feed Beer

A wort (12.5° Plato) was prepared from the following ingredients:

| | |
|---|---|
| Pale Malt, lbs. | 21,100 |
| Foundation Water, bbl. | 180 |
| Sponge Water, bbl | 94 |
| Chase Water, bbl | 2 |
| CaSO$_4$ lbs. | 30 |
| CaCl$_2$, lbs. | 26 |

The ingredients were mashed at 115° F. for 20 minutes, the temperature raised to 156° F. and held for 30 minutes and raised to 170° F. and held for 5 minutes. The mixture was transferred to a lauter tun and boiled for 60 minutes. It was kettle hopped with 100% Cascade hops (125 lbs.) to 33.5 BU. It was aerated and pitched at about 10 million cells/cc, of *Saccharomyces uvarum* and fermented at a constant 60° F. (15.5° C.). The yeast concentration reached a maximum of 7.35 grams/liter (dry weight basis). About 190 hours were required to complete the fermentation. The feed beer obtained had a conventional lager beer taste with the exception that it had more hop flavor and aroma and bitterness than many typical lager beers. The finished feed beer contained about 3.65% w/w alcohol (4.67% by volume); had a BU level of 33.5, was pale straw-colored (4.5° SRM) and had a specific gravity of 1.0102.

EXAMPLE 2

Ultrafiltration of Feed Beer

The feed beer of Example 1 is concentrated by ultrafiltration using an OSMONICS MX07 UF300 membrane at 120 psi. When only a colorless, water-white, clear beer is desired, the beer can be concentrated up to 10 fold with the resulting permeate being the base. When an NA malt beverage is being co-produced, only a 4 fold concentration is preferred so as not to deplete the retentate of important beer flavor compounds. In other words, the beer components retained by the ultrafiltration membrane have a 10 fold or a 4 fold greater concentration in the retentate than they do in the feed beer by virtue of the respective volumes of feed beer to retentate (10:1 or 4:1, respectively). The retentate can be diluted with diluent water in equal parts to the retentate (1:1), subjected to a second ultrafiltration and the second permeate added back to the clear beer. As a result no alcohol is lost to waste.

EXAMPLE 3

Preparation of Colorless, Clear Beer

To a permeate obtained by the ultrafiltration process of Example 2 there is added 1% by weight of intermediate dextrins and 1% by weight of high dextrins. At plant scale, the syrups can be mixed by adding them slowly to the front end of a circulation pump in a typical circulation loop. At laboratory or pilot scale to facilitate the mixing of the intermediate and high dextrins (Staley 200 and M100 Maltrin) with the permeate, a mixture is prepared (10% Staley 200 and 10% GPC's M100) in a portion of the permeate, and dissolved by heating to 120° F. for 30–60 minutes to form a concentrate. This concentrate is then added to the permeate to a final formulation concentration of 1% Staley 200 and 1% GPC M100. The natural beer foaming component prepared by carbon treatment of the feed beer (as described in Example 5) is added at 10% to impart foam. The formulation is completed by adding the hopping material tetrahydroisohumulone (THISO) to a final concentration of 10 ppm. The colorless, water-white, clear beer is then final filtered prior to packaging using a 0.45 micrometer membrane filter.

A typical clear beer obtained by the preferred method of the invention has the following composition:

| | |
|---|---|
| Alcohol, % w/w | 3.65 |
| Alcohol, % v/v | 4.56 |
| Real Extract, % w/w | 2.25 |
| Extract/Alcohol | 0.63 |
| Orig Gravity, Calc. | 9.26 |
| App Extract, % w/w | 0.61 |
| Specific Gravity | 1.00236 |
| Calories/12 oz | 120 |
| pH | 4.7 |
| Color, SRM | 0.2 |
| BU | 8.2 |
| Initial Clarity | 40 |

EXAMPLE 4

Nonalcoholic Malt Beverage Retentate

A 20–40% solution of intermediate dextrins (Staley 200) is made up in diluent water and dissolved by heating at 120° C. for 30–60 minutes, and then added to the diafiltered retentate (2% alcohol) from Example 2 to a final product concentration of 4%. The retentate is further diluted to 0.4% w/w alcohol, and the product is final filtered and packaged as for a regular nonalcoholic malt beverage.

EXAMPLE 5

Preparation of Natural Beer Foaming Component

A portion of the feed beer of Example 1 is treated with 0.25–1.0% Darco KB-B carbon (pre-slurried with 60° C. water) at −1°–5° C. for a minimum contact time of 2 minutes (up to a 12 hour contact time has been found to be acceptable). The carbon is then removed by filtration for example using a 0.45 micrometer (0.8 um, carbon fines bleed through) membrane filter (Millipore type HA nitrocellulose). (With this filter, 100 barrels of 0.35%–0.5% carbon treated primary beer can be filtered in 8 hours using 375 square feet of membrane.) The decolorized natural beer foaming component (color less than 1.0° SRM) is held until required.

EXAMPLE 6

Preparation of Natural Beer Foaming Component From Malt

Conventional brewer's malt is ground and mixed with 1 to 5 parts water to 1 part malt at 1° to 15° C. The resulting mash is strained and centrifuged with the sediment being discarded. A clear supernatant is diafiltered four times using an OSMONICS UF 3000 membrane to remove unwanted color and flavor. The permeates are discarded. The retentate is concentrated, pasteurized for 15 minutes at 65° C. and centrifuged to obtain a clear supernatant fluid which can be used as a natural beer foaming component. The supernatant fluid can be further treated with carbon to improve its foaming properties.

EXAMPLE 7

Preparation of Natural Beer Foaming Component From Retentate

To a retentate obtained from the ultrafiltration process of Example 2 there is added 0.5 to 2% Darco KB-B carbon (pre-slurred with 60° C. water) at −1° to 85° C. for a minimum contact time of 2 minutes up to 1 hour. The carbon is removed in the same manner as set forth in Example 5 to result in a similar decolorized natural beer foaming component which is held until required.

EXAMPLE 8

Preparation of Natural Beer Foaming Component From Brewer's Yeast

To a permeate obtained from the ultrafiltration process of Example 2 there is added a carbon treated Brewer's yeast extract. The Brewer's yeast is disrupted by any one of a variety of methods, for example, shaking with glass beads or disruption using a Gallun homogenizer. The extract is clarified by centrifugation and the supernatant is treated with Darco KB-B carbon in the same amount and manner as set forth in Example 7 and the carbon removed from the Brewer's yeast extract in the manner set forth in Example 5 to result in the natural beer foaming component.
Preparation of Flavored Malt Beverages The flavored malt beverages of the present invention are produced by first making a base beer using a normal high gravity brewing, fermenting, and aging process. The mashing conditions are typically 20 minutes at 122° F., then 15 minutes at 145° F., then 15 minutes at 160° F., then 5 minutes at 170° F. The kettle boil is typically 60–90 minutes at the end of kettle fill. The wort is 14° to 15° Plato and is pitched with $25 \times 10^6$ cells of *Saccharomyces uvarum* with a temperature ramp from 54° F. to 60° F. Fermentation is conducted for 4 to 5 days. Glucoamylase is added to the fermentation kettle at 1323 units/liter. The base beer recovered from the fermenter is then treated for at least partial color removal.

Typically, a 21:79 by wt. malt/dextrose ratio is used to produce the base beer. However, a higher proportion of malt may be used, limited only by residual beer character in the reduced color malt base (formed after carbon treatment or ultrafiltration of the base beer) interfering with the desired flavor profile of the final product. For example, a 56:44 by wt. malt/dextrose ratio has resulted in a flavored malt beverage having an acceptable flavor profile. One should understand that little or no beer components remain in the reduced color malt base (compared to the clear beer permeate, supra) after carbon treatment or ultrafiltration because less malt and hops are used in the brewing process of the base beer (compare with clear beer feed beer of Example 1).

The process of making the flavored malt beverages of the present invention includes adding an enzyme capable of converting non-fermentable carbohydrates to fermentable carbohydrates. The preferred enzyme is glucoamylase.

By removing at least a portion of the color from the base beer we mean removing a sufficient amount of the malt/hop flavor so as to not interfere with the flavor profile of the final flavored malt beverage. The color removal may be by any number of methods including exchange resins or cyclodextrins. However, carbon filtration and ultrafiltration are preferred.

Using carbon filtration, the preferred dosage of carbon is 0.1 to 1.0% w/w. The preferred type of carbon is Darco KB-B. The optimal amount of carbon depends on the color and alcohol content of the base beer. The carbon is removed by filtration using any one of several types of filters discussed, supra. Using ultrafiltration, the preferred membrane is one having the same properties as the OSMONICS MX07 300 UF polyamide/polysulfone composite membrane. The base beer is ultrafiltered at 40° F. to 50° F. at 120 psi and concentrated 10 to 12 fold.

The flavored malt beverages of the present invention minimize consumer sensations of fullness, i.e. they are drinkable and refreshing. One method of measuring these desired characteristics uses a taste panel to produce a Hedonic score. By Hedonic score we mean the consumer's overall liking based on all attributes taken together. A given Hedonic score is based on a taste panelist's personal frame of reference. A preferred Hedonic score is above 4.5. A more preferred Hedonic score is above 5.5. A most preferred Hedonic score is above 6.5. For a discussion of Hedonic scoring, see E. Larmond, *Methods for Sensory Evaluations of Food*, (1980).

A stable citrus flavored malt beverage, and method of making it, preferably uses International Flavors & Fragrances (IFF) Lemon flavoring formula #13580157. By stable, we mean the essential absence of sulfide off-flavors (described by sensory panelists as "wet dog" and "rotten fruit") if stored at least 4 months at 75° F. For example, storage at 140° C. for 3 days can be used to approximate 8 to 12 months at room temperature (75° F.). Preferably, the citrus flavored malt beverage is stable for at least 6 months at room temperature.

EXAMPLE 9

Definitions

By flavorings, we mean any fruit, quinine, tea, coffee, guarana nut, chocolate, licorice, fruit juice, anise, root beer, cola, rum/coke, gin/tonic, margarita, whiskey sour, pina colada, Long Island iced tea flavors. Preferred flavorings are quinine, brandy, loganberry, tea, apple, and lemon. By quinine, we mean the alkaloid extracted from cinchona bark and all of its chemical derivatives. However, quinine hydrochloride and quinine sulfate are preferred.

Malic acid is most preferred but other food grade acids (such as succinic, citric, phosphoric) may give acceptable flavor profiles. Less than 500 ppm tartaric acid, and preferably no tartaric acid, is desired as an additive in the present invention because it gives a lingering dry/sour taste to the flavored malt beverage. Malic acid is most preferred because it gives a smooth, round feel to the flavored malt beverage.

Other preferred stable citrus flavorings suitable for the present invention include IFF lime flavor no. 73566800 and IFF citrus/gin flavor no. 19-WS-0431. Another preferred stable citrus flavoring suitable for the present invention is Bothwicks flavor no. B-28894.

Generally speaking, any flavoring can be used in the present invention if it is organoleptically compatible with the reduced color malt base of the present invention.

The flavored malt beverages of the present invention meet the BATF requirements that the base beer be formulated such that the dry weight of the malt constitutes at least 25% by weight of the total dry weight of all ingredients which contribute fermentable extract to the base beer and that at last 7.5 lbs. of dry hops are added to each 100 barrels of base beer (1 lb. hop extract equals 1.8 lbs. dry hops).

The malt base of the present invention can be used as a mixer for all manner of liquors like fruit flavored liquors, whiskey, gin, tequila, rum, and fruit juices due to its body, sweetness, alcohol level, acidity, and neutral flavor profile.

By real extract, we mean the difference in the weight of an evaporated sample and that of the ash from combusting the evaporated sample. It measures solids which are metabolized by mammals (carbohydrates, proteins, etc.).

By % $CO_2$ v/v, we mean the difference in liquid sample volume after the $CO_2$ is precipitated out as a carbonate.

Method of Manufacture

A base beer is produced using normal high gravity brewing, fermenting and aging processes. At least partial color is removed from the base beer by carbon filtration to make the reduced color malt base, followed by adjunct and flavor addition and normal finishing.

Approximate alcohol content of the neutral malt base is 6.0 to 7.5% by weight and of the finished flavored product is 3.0 to 3.5% by weight.

Process Water
 Water treated to brewing standards.
Mash Mixer
 Process water
 Mineral Salts to Brewing Standards (Example 1, supra.).
 Barley malt (see Note 1). 7440 pounds per 800 barrel brew at 14.3° Plato. The base product is formulated such that the dry weight of the malt constitutes at least 25% by weight of the total dry weight of all ingredients which contribute fermentable extract to the base product.
Kettle
 Process Water
 Dextrose (see Note 2). 36,630 pounds per 800 barrel brew at 14.3° Plato.
 Yeastex (see Note 3). Added at 40 pounds per 800 barrel brew.
Wort Cooling and Transfer
 Process Water
 Air
 Yeast—$25 \times 10^6$ cells/ml *Saccharomyces uvarum*
Fermenter
 Process Water
 Carbon Dioxide
 Glucoamylase (see Note 4). Added at 12 to 16 liters per 800 barrel brew.
Transfer to Aging
 Process Water
 Carbon Dioxide
 Diatomaceous Earth and Cellulose Filter Aids
 Modified Hop Extract (see Note 5). Added at 4.7 pounds per 100 barrels of neutral malt base (equivalent to 8.5 pounds of dry hops).

Aging
 Carbon Dioxide
Carbon Filtration
 Carbon
 Diatomaceous Earth and Cellulose Filter Aids
Transfer to Package Release
 Diluent (see Note 6)
 Carbon Dioxide for a final 2.5 to 2.8% v/v
 Malic Acid (see Note 7), as manufactured by Haarman & Reimer Corp. and supplied by Van Waters and Rogers, is added to the finished product to enhance flavor, at the rate of 0.2 to 0.4 g/100 ml.
 Liquid Corn Adjunct (see Note 8), as supplied by A. E. Staley Manufacturing, is added to the finished product to impart body and sweetness, at 40 to 80 grams per liter.
 The following flavors may be added alone or in combination to the neutral malt base:
  Quinine Hydrochloride, CAS No: [130-89-2] (see Note 9), as manufactured by DSMAndeno and supplied by R. W. Greef & Co., Inc. is added to the finished product to impart bitterness at the rate of 6 to 25 ppm; and/or,
  Natural Flavor Taste of Brandy, Flavor #DY-08505 (see Note 10), as manufactured and supplied by Quest International, Owings Mills, Md., is added to the finished product at 0.02 to 0.06 g/100 ml; and/or,
  Loganberry Flavor WONF, Flavor #DY-08404 (see Note 11), as manufactured and supplied by Quest International, Owings Mills, Md., is added to the finished product at 0.04 to 0.12 g/100 ml.
Notes:
 1. Barley malt as received from suppliers contains 5 to 25 ppm of $SO_2$ (sulfur dioxide). This residue results from the use of sulfur in the malting process. Dilution, plus the kettle boil, reduces the $SO_2$ to a level less than 1 ppm, if not entirely. Laboratory tests accurate to 0.5 ppm substantiate the elimination of the $SO_2$.
 2. Dextrose, as received from suppliers, contains no additives or preservatives. Liquid corn adjunct contains only residual corn material and water. It contains less than 3 ppm $SO_2$ as received.
 3. Yeastex, a yeast nutrient, is assimilated by the yeast during the fermentation process.
 4. Glucoamylase is an enzyme derived from *Aspergillus niger*, a filamentous fungus. It is used to effect a more complete conversion of carbohydrates to fermentable sugars. This, in turn, permits a more complete conversion of sugars to alcohol and $CO_2$. After fermentation, the beer is processed through a heat exchanger. The heat process destroys enzymatic activity. The enzyme preparation contains no additives or preservatives.
 5. Modified hop extract is derived from $CO_2$ hop extract, as defined in the Code of Federal Regulations, Title 21, Section 172,560, paragraph b(1).
 6. Diluent is carbonated process water treated to brewing standards.
 7. Malic Acid is a flavor enhancer used for tartness and flavor enhancement.
 8. Liquid Corn Adjunct, as received from suppliers, contains no additives or preservatives. Liquid corn adjunct contains only residual corn material and water. It contains less than 3 ppm $SO_2$ as received.
 9. Quinine hydrochloride is, as received, a fine white odorless powder used to impart bitterness.
 10. Brandy flavor is a liquid material with the characteristic odor and flavor of brandy.
 11. Loganberry flavor is a liquid material with the characteristic odor and flavor of loganberry.

EXAMPLE 10

A. Reduced Color Malt Base
 Bill of materials for a 440 barrel brew at 14.30° Plato O.G. are:
  4,300 pounds malted barley
  20,145 pounds liquid dextrose
  22 pounds yeastex
  10.6 pounds modified hop extract (equivalent to 49.6 pounds dry hops)
  7.9 liters Glucoamylase
Method of Manufacture
 A base beer is produced using normal high gravity brewing, fermenting and aging processes. At least a portion of the color is removed from the base beer by ultrafiltration at a pressure of about 30 psi to about 190 psi using a nominal 300 molecular weight cutoff range to obtain a neutral malt base as a permeate. Approximate alcohol content of the neutral malt base is 6.0 to 7.5% by weight. Original Gravity of 14.15° to 14.45° Plato (high gravity brewing)
B. Tea Flavored Product
 Finished product
  1.000 barrel neutral malt base product
  0.935 barrel water
  6.700 pounds high fructose corn syrup (77%), A. E. Staley
  0.522 pounds natural tea essence, Borthwicks #B-28575
  0.392 pounds tea leaves, Southern Tea
  0.365 pounds malic acid, Ashland Chemicals (0.14 g/100 ml)
  0.076 pounds caramel color, D. D. Williamson
  0.015 pounds red fruit extract, Quest International
  Approximate alcohol content—3.6 to 3.8% by weight
  Calculated Original Gravity—7.35° to 7.93° Plato
C. Stable Lemonade Flavored Product
 Finished product
  1.000 barrel neutral malt base product
  0.935 barrel water
  27.85 pounds high fructose corn syrup, (77%), A. E. Staley
  1.169 pounds malic acid, Ashland Chemicals (0.45 g/100 ml)
  0.522 pounds natural lemon flavor, International Flavors & Fragrances (IFF) #13580157, Union Beach, N.J.
  0.444 pounds cloudifier, IFF #73589352
  0.047 grams FDC yellow #6 color, Warner Jenkinson
  0.012 grams FDC blue #1 color, Warner Jenkinson
  0.058 grams FDC red #40 color, Warner Jenkinson
  Approximate alcohol content—3.6 to 3.8% by weight
  Calculated Original Gravity—7.35° to 7.93° Plato
D. Cider/Apple Flavored Product
 Finished product
  1.000 barrel neutral malt base product
  0.935 barrel water
  11.22 pounds high fructose corn syrup (77%), A. E. Staley
  8.090 pounds apple cider concentrate (70 brix), Tree Top
  0.287 pounds malic acid, Ashland Chemicals (0.13 g/100 ml)
  0.261 pounds natural apple cider flavor, IFF
  0.074 pounds caramel color, D. D. Williamson

EXAMPLE 11

Beer tails may be used to blend with flavored syrups through a drink dispenser by a mixologist. The preferred beer tails are produced in the high gravity brewing of Examples 9 and 10, except that the alcohol by wt. may be from 6 to 10%. The base beer is preferably ultrafiltered. Beer tails are preferably shipped to the point of sale in barrels. The beer tails can then be dispensed in an automatic metering device along with flavored syrups to make, for example, gin/tonic, rum/coke, Tom Collins, Margarita flavored malt beverages. Beer tails may also be packaged in typical single use containers (e.g., bottles, cans) to be mixed with a container of flavoring attached to the single use container.

It will be readily apparent to those skilled in the art that a number of modifications and changes may be made without departing from the spirit and scope of the present invention. Therefore, it is intended that the invention only be limited by the claims.

We claim:

1. A method of preparing a flavored malt beverage, comprising:

subjecting a base beer to ultrafiltration to obtain a reduced color malt base as a permeate; and combining the reduced color malt base with at least one flavoring, a sweetening agent, malic acid, and carbon dioxide, wherein the flavored malt beverage contains 2.5 to 2.8% v/v $CO_2$, 2.9 to 3.5% w/w alcohol, 12.5 to 13.5 calories/fluid oz., 0.2 to 0.4 g/100 ml malic acid, 5.4 to 5.8% w/w real extract, and no tartaric acid.

2. The method of claim 1, wherein the flavoring is quinine.

3. The method of claim 1, wherein the flavoring is a mixture of brandy flavor and loganberry flavor.

4. A method of preparing a flavored malt beverage, comprising:

subjecting a base beer to ultrafiltration to obtain a reduced color malt base as a permeate; and combining the reduced color malt base with at least one flavoring, a sweetening agent, malic acid, and carbon dioxide, wherein the flavored malt beverage contains 2.5 to 2.8% v/v $CO_2$, 3.45 to 3.85% w/w alcohol, 15 to 22 calories/fluid oz., 0.05 to 0.5 g/100 ml malic acid, 6.0 to 11.6% w/w real extract, and no tartaric acid.

5. The method of claim 4, wherein the flavoring is tea flavoring.

6. The method of claim 4, wherein the flavoring is apple flavor.

7. The method of claim 4, wherein the flavored malt beverage contains lemon flavoring, 20–22 calories/fluid oz., 0.4 to 0.5 g/100 ml malic acid, and 10 to 11.6% w/w real extract.

8. The method of claim 7, wherein the flavored malt beverage has the essential absence of sulfide off-flavors if stored at least four months at 75° F.

9. The flavored malt beverage produced by the method of claim 1, wherein the malic acid and the absence of tartaric acid cooperate to minimize sensations of lingering dryness and sourness experienced by consumers of the flavored malt beverage, and to enhance sensations of a smooth and round mouthfeel experienced by said consumers.

10. The flavored malt beverage produced by the method of claim 4, wherein the malic acid and the absence of tartaric acid cooperate to minimize sensations of lingering dryness and sourness experienced by consumers of the flavored malt beverage, and to enhance sensations of a smooth and round mouthfeel experienced by said consumers.

11. The flavored malt beverage produced by the method of claim 8, wherein the malic acid and the absence of tartaric acid cooperate to minimize sensations of lingering dryness and sourness experienced by consumers of the flavored malt beverage, and to enhance sensations of a smooth and round mouthfeel experienced by said consumers.

12. A flavored malt beverage product, consisting essentially of:

a reduced color malt base produced by ultrafiltering at least a portion of the color from a base beer;

at least one flavoring;

a sweetening agent;

2.5 to 2.8% v/v $CO_2$;

2.9 to 3.3% w/w alcohol;

12.5 to 13.5 calories/fluid oz.;

0.2 to 0.4 g/100 ml malic acid;

5.4 to 5.8% w/w real extract; and no tartaric acid;

wherein the malic acid and the absence of tartaric acid cooperate to minimize sensations of lingering dryness and sourness experienced by consumers of the flavored malt beverage, and to enhance sensations of a smooth and round mouthfeel experienced by said consumers.

13. The flavored malt beverage of claim 12, wherein the flavoring is quinine.

14. The flavored malt beverage of claim 12, wherein the flavoring is a mixture of brandy flavor and loganberry flavor.

15. A flavored malt beverage product, consisting essentially of:

a reduced color malt base produced by ultrafiltering at least a portion of the color from a base beer;

at least one flavoring;

a sweetening agent;

2.5 to 2.8% v/v $CO_2$;

3.45 to 3.85% w/w alcohol;

15 to 22 calories/fluid oz.;

0.05 to 0.5 g/100 ml malic acid;

6.0 to 11.6% w/w real extract; and no tartaric acid;

wherein the malic acid and the absence of tartaric acid cooperate to minimize sensations of lingering dryness and sourness experienced by consumers of the flavored malt beverage, and to enhance sensations of a smooth and round mouthfeel experienced by said consumers.

16. The flavored malt beverage product of claim 15, wherein the flavoring is tea flavoring.

17. The flavored malt beverage product of claim 15, wherein the flavoring is apple flavor.

18. The flavored malt beverage product of claim 15, wherein the beverage contains lemon flavoring, 20–22 calories/fluid oz., 0.4 to 0.5 g/100 ml malic acid, and 10 to 11.6% w/w real extract.

19. The flavored malt beverage product of claim 18, wherein the beverage has the essential absence of sulfide off-flavors if stored at least four months at 75° F.

* * * * *